Figure 3:
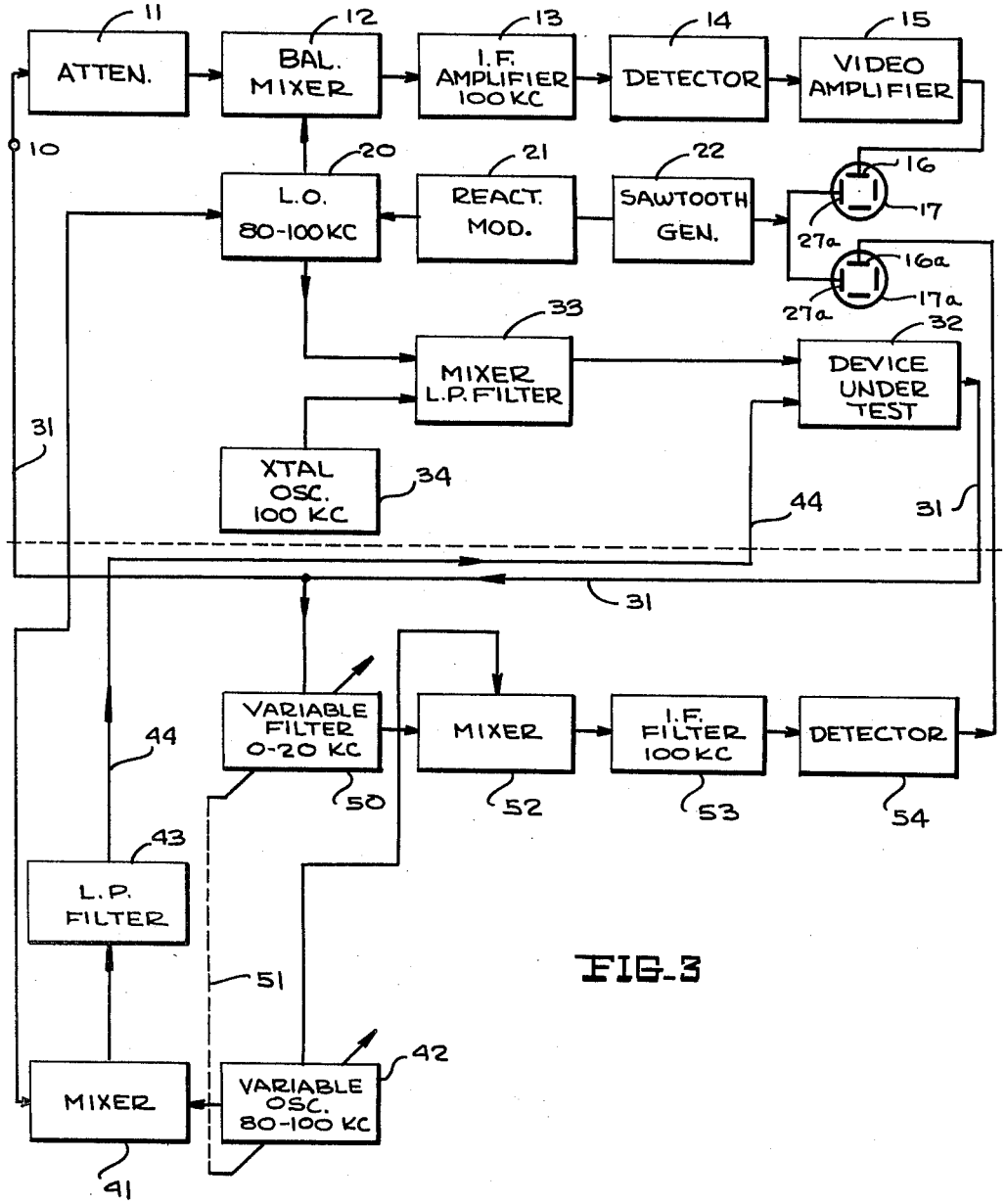

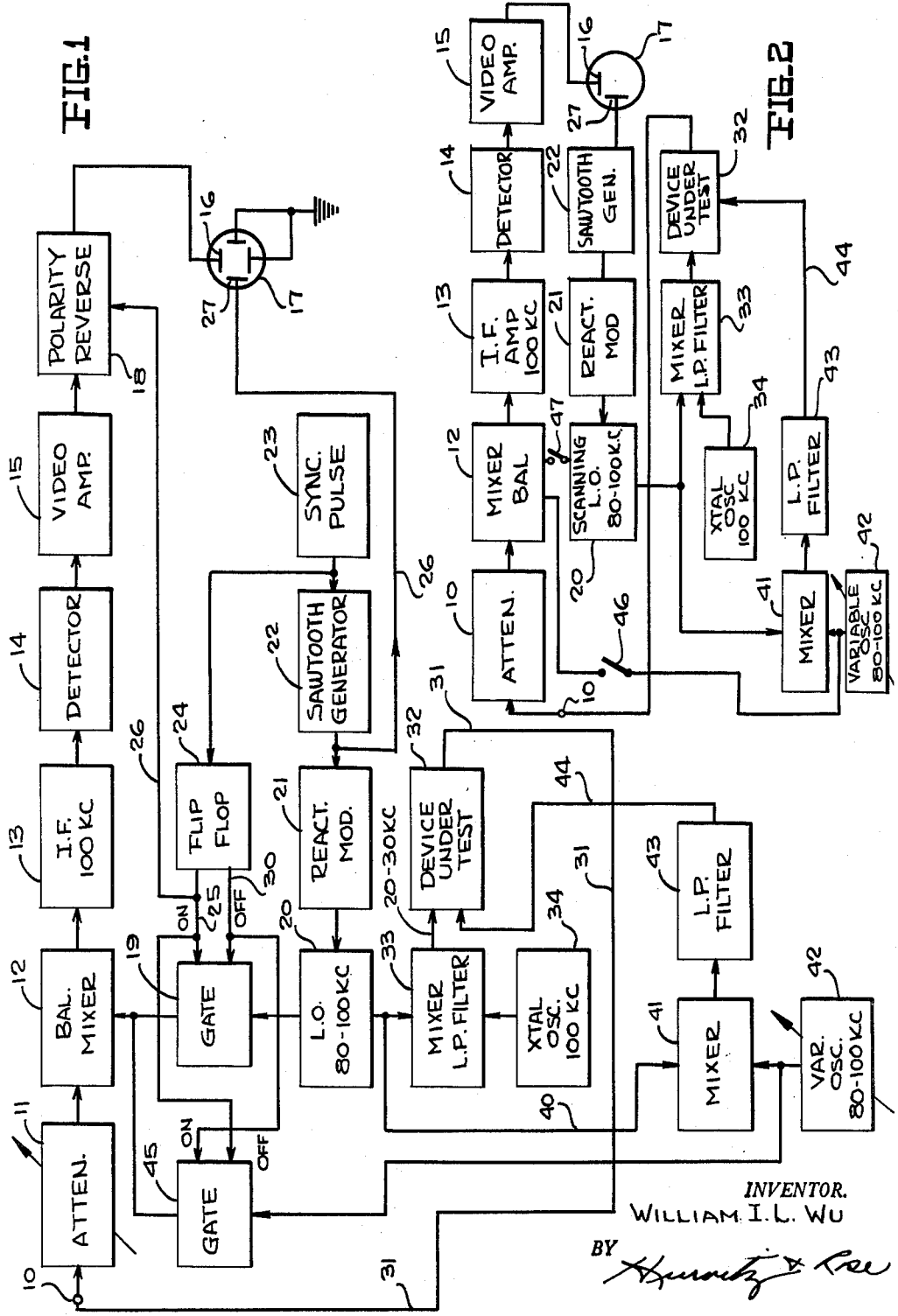

United States Patent Office 3,241,059
Patented Mar. 15, 1966

---

3,241,059
INTERMODULATION DISTORTION PLOTTER
William I. L. Wu, New Rochelle, N.Y., assignor, by mesne assignments, to The Singer Company, a corporation of New Jersey
Filed Jan. 30, 1961, Ser. No. 85,765
2 Claims. (Cl. 324—57)

The present invention relates generally to systems for measuring frequency response characteristics, and more particularly to systems for plotting intermodulation distortion and/or frequency response characteristics, separately or in coordination.

Briefly describing the present invention, a scanning spectrum analyzer of the superheterodyne type forms a basis for a preferred embodiment of the system of the invention. Analyzers of this type normally include a superheterodyne receiver having a frequency scanning local oscillator, and a display device such as an X–Y recorder or a cathode ray tube indicator. The display generator of the latter, i.e., the pen or cathode ray beam, is caused to move in one coordinate axis as a function of local oscillator frequency, and in another coordinate axis as a function of response of the receiver.

The local oscillator output is heterodyned with a first fixed frequency signal to generate a first scanning frequency covering the band for which frequency response is desired. This fixed frequency may conveniently equal the response frequency of the I.F. amplifier of the receiver. The last mentioned scanning frequency is then applied to the input of the system under test for its frequency response, and the output of the system applied to the input of the spectrum analyzer. The spectrum analyzer will, for the described arrangement, always be tuned to the frequency applied to its input, and accordingly will plot the frequency response curve of the system under test.

The system as described to this point is known.

According to the invention, the output of the scanning local oscillator is heterodyned with a second fixed frequency signal, differing from the first by some values $\Delta f$. There results a second scanning frequency which differs always from the first scanning frequency by $\Delta f$. The first and second scanning frequencies are simultaneously applied to the device or system under test, generating an intermodulation signal of constant difference frequency $\Delta f$ at its output, the magnitude of the intermodulation signal being indicative of the extent of non-linearity of the system under test. The frequency $\Delta f$ is now applied to the input of the spectrum analyzer, and a new non-scanning local oscillator substituted in the superheterodyne receiver for the scanning local oscillator, to wit, the second fixed frequency oscillator. Its value is selected to differ from the I.F. frequency by $\Delta f$, and hence converts $\Delta f$ to I.F. frequency, whereupon the spectrum analyzer generates its usual display, which now represents IM distortion as a function of frequency.

Modifications of the invention are provided. In one of these separate amplifier and display channels are provided for the IM distortion display, and the single frequency response display, i.e., two C.R.T. indicators may provide simultaneously separate plots of response of a system to a single scanning frequency and to a pair of scanning frequencies separated by $\Delta f$, in terms of IM distortion.

According to another modification, a single display device is utilized, but automatic switching devices are provided to render the system responsive alternatively to provide single frequency response and IM response, the displays being readily distinguishable for example, because involving oppositely directed plots.

It is, accordingly, an object of the invention to provide a novel system for measuring intermodulation distortion generated by two scanning frequencies separated by a fixed value during scanning.

It is another object of the invention to provide a system for generating at will a plot representing response of a system under test, such as a transducer, amplifier, or the like, to a scanning single frequency and to the difference of a pair of scanning frequencies of equal spacings.

Still a further object of the invention resides in the provision of a system for generating a display or displays representing simultaneously response of a system under test to a single scanning frequency and to the difference between a pair of scanning frequencies of constant separation.

The above and still further objects, features and advantages of the present invention will become apparent upon consideration of the following detailed description of one specific embodiment thereof, especially when taken in conjunction with the accompanying drawings, wherein FIGURES 1–3 are functional block diagrams of alternative embodiments of the invention.

Referring now more particularly to the accompanying drawings, and particularly FIGURE 1 thereof, the reference numeral 10 denotes a signal input terminal to a device which is essentially a scanning spectrum analyzer of the superheterodyne type. Devices of this character are per se well known, and are exemplified in U.S. patent to Tongue, No. 2,661,419, issued December 1, 1953. The signal applied to terminal 10 is passed via an adjustable attenuator 11 to a balanced mixer 12 for frequency conversion therein. The converted output is selected by an I.F. filter 13, and the output of the latter is detected in a suitable detector 14 (linear or power), the video signal resulting from the detection process being amplified in video amplifier 15 and applied to the vertical deflection electrodes 16 of a cathode ray tube indicator 17, via a controllable polarity reversing gate 18. The purpose of the latter will appear hereinafter.

Scanning local oscillator signal is applied to balanced mixer 12 via ON–OFF gate 19 from a scanning oscillator 20. The frequency of the latter is caused to scan over a suitable range, say 80–100 kc., where the input signal at terminal 10 is an audio signal, by means of a reactance modulator 21, driven from a sawtooth generator 22. Assuming I.F. amplifier 13 to be narrow band, and centered on 100 kc., as the oscillator 20 is caused to vary from 80–100 kc., input signals extending from 20 kc. to 0 are translated, in sequence, to I.F. frequency. The sawtooth generator 22 is synced by sync pulse generator 23 which also supplies control pulses to a flip-flop or bi-stable device 24, the latter reversing state in response to each control pulse. Bi-stable device 24 simultaneously supplies an "ON" signal to gate 19 and an "unreversed polarity" control signal to polarity reverser 18, via leads 25 and 26, so that positive polarity video is applied to deflection electrodes 16 while local oscillator 20 scans through a first set of values 80–100 kc. On a succeeding scan, gate 19 is rendered closed or "OFF" by virtue of signal applied via lead 30 from flip-flop 24. The output of sawtooth generator 22 is applied via lead 26 to the horizontal deflection electrodes 27 of C.R.T. 17.

In operation, then, a band of audio frequencies applied to input terminal 10 is analyzed for spectrum content on alternate scans of local oscillator 20, and displayed as positively going deflections on the face of C.R.T. 17, plotted against a horizontal frequency base line, in the manner usual for scanning spectrum analyzers.

The audio band applied to input terminal 10 derives via lead 31 from a device under test, 32, i.e., any entity to which a scanning band of audio signals may be applied and the response of the device under test to the applied audio band obtained. Examples are: transducers, amplifiers, filters, etc.

The scanning audio band for application to device under test 32 is derived from a mixer 33, to the inputs of which are applied the output of a fixed frequency 100 kc. oscillator 34, and the scanning local oscillator 20.

In operation, as local oscillator 20 scans from 80-100 kc., mixer 33 generates, by heterodyne subtraction, the band 20-0 kc. The latter band passes through the device under test 32, as a constant amplitude signal, has its amplitude and phase modified by the response characteristic of device 32, and is then applied via lead 31 to input terminal 10. At the same time, the local oscillator 20 is converting the audio band appearing at terminal 10 to the 100 kc. I.F. frequency, and the system converts the I.F. frequency to a display of response amplitude of device 32 versus frequency.

The output of scanning local oscillator 20 is also applied via lead 40 to a mixer 41. To the latter is also supplied the output of a variable oscillator 42, having the range 80-100 kc. The heterodyne output of mixer 41 feeds a low pass filter 43, and the latter supplies signal to the device under test 32 via lead 44.

Assuming that the device under test 32 is a non-linear device, i.e., a transistor circuit, vacuum tube circuit, transducer, or the like, difference frequencies will be generated in the device under test, which will be applied via lead 31 to input terminal 10. These difference frequencies represent intermodulation distortion.

Assume, for example, that the oscillator 42 is adjusted to provide an output of 99 kc. As the local oscillator 20 scans from 80-100 kc., the mixer 41 develops a difference frequency, scanning from 19-0 kc., with some overage when local oscillator 20 proceeds from 99-100 kc. The overage may be ignored. Concurrently, the mixer 33 is providing a scanning frequency proceeding from 20 kc. to 1 kc. Since the mixer 41 provides 19-0 kc. while the mixer 33 provides 20-1 kc., their outputs have a constant frequency difference $\Delta f$ of 1 kc. This difference, denominated herein $\Delta f$, is generated as a signal by device under test 32, where the latter is non-linear, and the latter signal appears on lead 31 and is applied to terminal 10. The amplitude of this signal, nevertheless, may continuously vary, during each scan, as a function of non-linearity of device under test 32.

While gate 19 is turned "OFF" in response to a gating signal supplied by flip-flop 24, gate 45 is turned "ON," and passes the output of oscillator 42 to balanced mixer 12, in place of the output of scanning oscillator 20. The oscillator 42 is, in the example provided, at 99 kc. The signal applied to input terminal 10 is at 1 kc. The sum frequency is, therefore, constantly 100 kc., and passes through I.F. amplifier 13, is detected, and provides a display or plot on C.R.T. 17. During generation of this display or plot, flip-flop 24 provides a gating signal to polarity reverser 18, so that the display goes negatively.

Accordingly, the display on the face of C.R.T. 17 relates to two distinct but comparable information contents. One, involving positively going deflections, shows the frequency response curve of device under test 32. The other, involving negatively going deflection, shows the frequency response curve of intermodulation distortion produced by device under test 32, on insertion of two signals scanning in synchronism with a constant frequency difference of $\Delta f$. Clearly, the value of the frequency difference $\Delta f$ can be changed, by varying the frequency of oscillator 42. The frequency base lines for the two displays are locked, since both are controlled by the same scanning local oscillator 20. The amplitude responses are also comparable, for the two plots, because the signals which generate the plots are amplified and detected by the same set of components.

In FIGURE 2 is illustrated in functional block diagram form, a simplified version of the system of FIGURE 1, in which, with switch 46 open, and switch 47 closed, the system operates to provide a plot of frequency response of device under test 32. With switch 47 open and switch 46 closed, a plot of intermodulation distortion is provided. Both plots have identically directed deflections, but are produced selectively, at will.

In FIGURE 3 of the accompanying drawings is illustrated in functional block diagram, a modification of the system of FIGURE 2, wherein the frequency response of a device under test 32 is plotted on a first C.R.T. 17, while simultaneously the IM distortion curve of the same device is plotted on a second C.R.T. 17a. Corresponding elements of FIGURES 2 and 3 are identified by the same numerals of reference, and description of these elements and their mode of coaction is not repeated.

In the system of FIGURE 3, the IM distortion component of the output of device under test 32 is selected by a tunable narrow band filter 50, which is ganged with oscillator 42 by conventional means indicated at 51. The filter 50 is always adjusted to accept the difference frequency between the frequency of oscillator 42 and 100 kc., which is the IM distortion frequency. The frequency passed by filter 50 is applied to a mixer 52 together with the output of oscillator 42, to regenerate a 100 kc. frequency. The latter is selected by I.F. filter 53, and the output of I.F. filter 53 is detected in detector 54, video amplified if necessary, and applied to vertical deflection electrodes 16a of C.R.T. 17a. The latter includes horizontal deflection electrodes 27a, which are driven from sawtooth generator 22.

In operation then, C.R.T.'s 17 and 17a develop synchronous plots, one representing frequency response and the other representing IM distortion, for the same device under test.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for plotting either single frequency response or intermodulation response of a system under test over a predetermined frequency band comprising: a scanning oscillator for providing a frequency spectrum having a width coincident with the width of the predetermined frequency band; means responsive to said scanning oscillator for deriving a pair of scanning frequencies always having a constant frequency separation, the frequency band of one of said pair of frequencies having a width coincident with the width of said predetermined frequency band; means for applying said pair of scanning frequencies to said system under test; a display system for providing an orthogonal coordinate plot of amplitude versus frequency; means for synchronizing the scanning of said frequency coordinate of said plot with the frequency variations of one of said pair of scanning frequencies; means responsive to the difference frequency of said pair of scanning frequencies deriving from said system under test for deriving a first constant frequency signal having an amplitude varying over said predetermined frequency band in accordance with the intermodulation distortion response of said system under test; means responsive to said predetermined frequency band deriving from said system under test for deriving a second signal having an amplitude varying over said predetermined frequency band in accordance with the single frequency response of said system under test; and means for applying said first and second signals to the amplitude coordinate of said display system, wherein said display system comprises: a cathode ray tube having a deflectable cathode ray beam; and means for selectively deflecting said cathode ray beam in accordance with the amplitudes of said first and second signals, and wherein said means for selectively deflecting includes means for successively and alternately applying said first signal and said second signal to said display system, and means for deflecting said cathode ray beam in one polarity direction during the time when said first signal is applied to said display system and for deflecting said beam in the opposite polarity direction during the time when said second signal is applied to said display system.

2. A system for plotting either single frequency response or intermodulation response of a system under test over a predetermined frequency band comprising: a scanning oscillator for providing a frequency spectrum having a width coincident with the width of the predetermined frequency band; means responsive to said scanning oscillator for deriving a pair of scanning frequencies always having a constant frequency separation, the frequency band of one of said pair of frequencies having a width coincident with the width of said predetermined frequency band; means for applying said pair of scanning frequencies to said system under test; a display system for providing an orthogonal coordinate plot of amplitude versus frequency; means for synchronizing the scanning of said frequency coordinate of said plot with the frequency variations of one of said pair of scanning frequencies; means responsive to the difference frequency of said pair of scanning frequencies deriving from said system under test for deriving a first constant frequency signal having an amplitude varying over said predetermined frequency band in accordance with the intermodulation distortion response of said system under test; means responsive to said predetermined frequency band deriving from said system under test for deriving a second signal having an amplitude varying over said predetermined frequency band in accordance with the single frequency response of said system under test; and means for applying said first and second signals to the amplitude coordinate of said display system, wherein said display system includes cathode ray tube means having a pair of deflectable cathode ray beams; means for applying said first signal to said display system to deflect one of said beams; and means for applying said second signal to said display system to deflect the second of said beams.

References Cited by the Examiner

UNITED STATES PATENTS

| | | | |
|---|---|---|---|
| 2,617,855 | 11/1952 | Etheridge | 324—57 |
| 2,622,127 | 12/1952 | Alsberg et al. | 324—57 |
| 2,671,198 | 3/1954 | Beverly | 324—57 |
| 2,929,989 | 3/1960 | Hurvitz | 324—57 |
| 2,971,152 | 2/1961 | Ranky | 324—57 |
| 3,032,712 | 5/1962 | Hurvitz | 324—57 |
| 3,119,062 | 1/1964 | Codd | 324—57 |

OTHER REFERENCES

"Intermodulation and Harmonic Distortion Measurements," article in Audio Engineering, October 1948, pp. 17, 18 and 55.

WALTER L. CARLSON, *Primary Examiner.*

SAMUEL BERNSTEIN, *Examiner.*